United States Patent [19]

Lörsch

[11] Patent Number: 4,851,174

[45] Date of Patent: Jul. 25, 1989

[54] PROCESS FOR TREATING A FILM MATERIAL TO ELIMINATE A BEND THEREIN

[76] Inventor: Johannes Lörsch, An Der Bleiche 49, D-4172 Straelen, Fed. Rep. of Germany

[21] Appl. No.: 79,671

[22] Filed: Jul. 30, 1987

[30] Foreign Application Priority Data

Aug. 18, 1986 [DE] Fed. Rep. of Germany ....... 3627985

[51] Int. Cl.4 ............................................. B29C 71/02

[52] U.S. Cl. .................................... 264/234; 264/235; 264/345; 264/346

[58] Field of Search ............... 264/230, 234, 235, 346, 264/345; 352/130; 354/297, 298

[56] References Cited

U.S. PATENT DOCUMENTS

| | | | |
|---|---|---|---|
| 1,768,501 | 6/1930 | Beidler | 354/297 |
| 2,093,817 | 9/1937 | Moller | 354/297 X |
| 2,313,173 | 3/1943 | Schneider et al. | 264/346 |
| 3,002,222 | 10/1961 | Sevison | 264/345 |
| 3,504,077 | 3/1970 | Sloan | 264/235 |
| 3,534,134 | 10/1970 | Mathews | 264/230 X |
| 3,671,619 | 6/1972 | Fitzgerald et al. | 264/346 X |
| 3,826,896 | 7/1974 | Thompson | 354/299 X |
| 4,047,213 | 9/1977 | Land | 352/130 X |
| 4,052,732 | 10/1977 | Meadows | 354/297 |
| 4,093,695 | 6/1978 | Heirbaut | 264/346 X |
| 4,310,485 | 1/1982 | Dauber | 264/346 X |
| 4,371,246 | 2/1983 | Siryj | 354/299 |
| 4,371,575 | 2/1983 | Kerk et al. | 264/230 X |
| 4,440,712 | 4/1984 | Imgram | 264/230 X |
| 4,483,814 | 11/1984 | Krajec et al. | 264/230 |
| 4,659,199 | 4/1987 | Jarvis et al. | 352/130 X |

*Primary Examiner*—Jan H. Silbaugh
*Assistant Examiner*—Karen D. Kutach
*Attorney, Agent, or Firm*—Mason, Kolehmainen, Rathburn & Wyss

[57] ABSTRACT

A process for treating a strip of film material carrying images in a plane to substantially remove a bend therein includes the steps of forceably positioning a portion of the film material having a bend into a common plane with the film image plane, subjecting the film portion to heat to remove the bend and thereafter allowing the heated film portion to cool.

3 Claims, 2 Drawing Sheets

PROCESS FOR TREATING A FILM MATERIAL TO ELIMINATE A BEND THEREIN

BACKGROUND OF THE INVENTION

The present invention relates generally to a process for treating film material having at least one bend therein.

In this specification, the term film material denotes any kind of film material such as positive film material or negative film material having images thereon and the term bend in the film material means a change in direction thereof, whether of large or small radius, as may occur for example when a film strip has been hung over an edge, a support line or the like, for the purposes of allowing the film to dry in the course of film development. Such bends can often given rise to problems when the film material is subjected to further processing, for example when positive film material is to be treated or processed in a slide framing apparatus.

SUMMARY OF THE INVENTION

An object of the present invention is to provide a simple way of removing bends in film material.

Another object of the present invention is to provide a process for treating film material to remove a bend therein, which process gives rise to little risk of damage to the film material.

Still another object of the present invention is to provide a process for removing a bend from film material, which process does not require or necessitate any substantially complicated equipment.

These and other objects are achieved in accordance with the teachings of the present invention by a process in which a portion of a strip of film material carrying images in a plane containing a bend therein is forceably positioned into a common plane with the film image plane. While the portion of the film material is held in the position of the film image plane, the film portion of the material having the bend is heated to remove the bend. The heat is applied for an appropriate period of time, and at such a temperature, as to cause the bend to be removed, at least to a satisfactory extent, and preferably completely.

DESCRIPTION OF PREFERRED EBODIMENTS OF THE INVENTION

In a preferred embodiment of the invention, a portion of the film material is positioned in a common plane with images carried on the film material. For example, the film strip is arranged in a flat and longitudinally aligned condition, at least in the region in which a bend is to be removed, by laterally engaging opposite edges of the film material in the perforation portion thereof. The necessary heating can be produced for example by hot air or by radiant heat.

The heat is applied to the film material in a manner that does not cause damage to the film material, for example, by causing a high temperature heat source to act on the film material, for a short period of time. The region of the film material containing a bend which is to be subjected to heat treatment in accordance with the invention (to at least very substantially remove the bend therein) is held in the flat and longitudinally aligned position corresponding to the film image plane until the bend region has sufficiently cooled down and is thus stabilized.

It may be provided in accordance with the invention that, after a bend has been removed, the film material is passed on directly for further treatment or processing in the same film image plane. The region of the film material which previously had the bend therein and which was subjected to heat treatment for the removal thereof can sufficiently cool down and thus set without a bend remaining, while the film is being transported on to a next station for further treatment and without any special steps being required to cool the film material.

APPARATUS FOR CARRYING OUT THE PROCESS OF THE INVENTION

The process can be carried out in different forms of equipment. It is thus possible for example to provide a closed passage with lateral guide means for engaging the film material in the perforation region thereof. A region of the film material which has a bend therein is forced into a planar position with the film image plane. Hot air at an appropriate temperature is applied to the film material for a suitable period of time while the film is held in the appropriate planar position between the edge guides. Thereafter, the film is cooled and sets while still being maintained in the planar position so that the previous bend in the film is substantially eliminated or removed completely.

Figure 1:
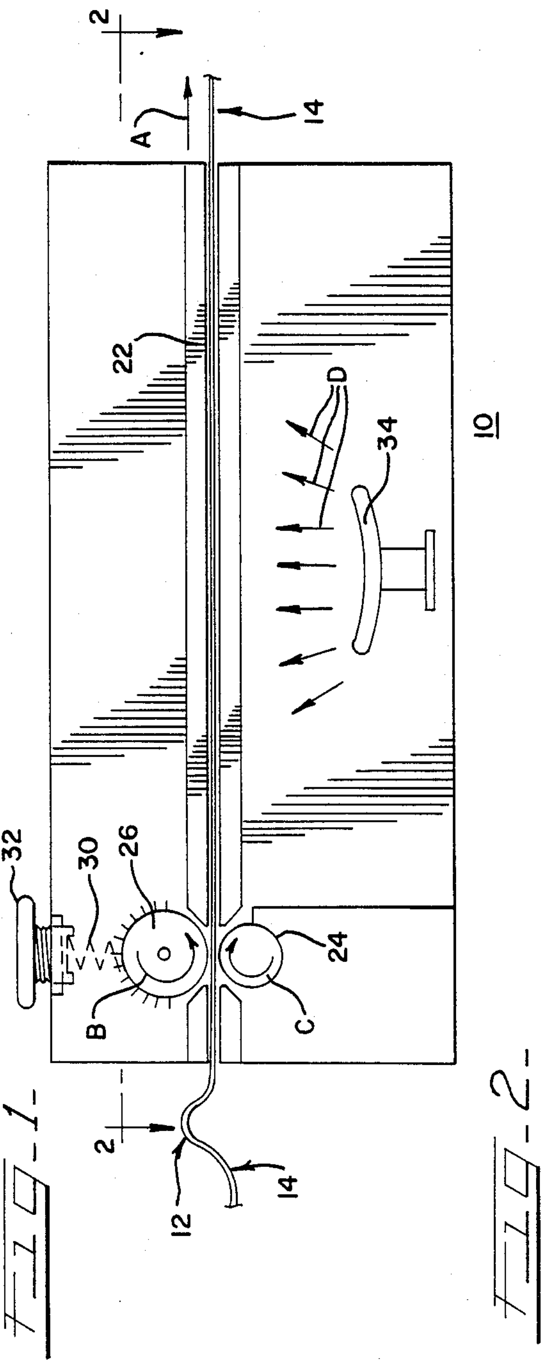
FIG. 1 is a side elevational view in longitudinal section of exemplary apparatus suitable for carrying out the process of bend removal in film material in accordance with the present invention taken substantially along lines 1—1 of FIG. 2.

DETAILED DESCRIPTION OF AN EMBODIMENT OF APPARATUS FOR CARRYING OUT THE PROCESS OF THE INVENTION

Referring now to FIGS. 1-4 of the drawings, therein is illustrated an exemplary apparatus 10 of conventional arrangement for use in carrying out the process of the present invention. The apparatus 10 is used to eliminate a crease or bend 12 (FIGS. 1 and 4) which is present in an elongated strip 14 of film material carrying a plurality of images 16 in a film image plane spaced along the length of the film strip in serial fashion. Customarily, the film strip 14 is provided with opposed rows of perforations 18 spaced serially along the length of the film strip in parallel with opposite longitudinal edges 20 of the film strip.

Figure 2:
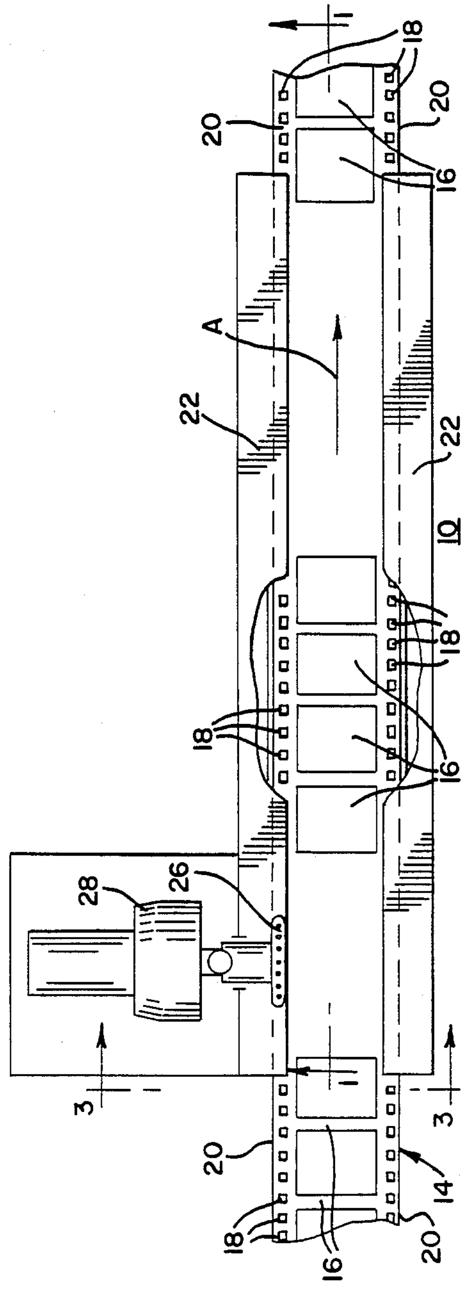
FIG. 2 is a plan view of the apparatus taken along lines 2—2 of FIG. 1.

Opposite edges 20 of the film strip 14 are guided and supported in a pair of channel-shaped, elongated, linear, edge guides 22 maintained in spaced apart parallel relation so that when the film strip 14 is inserted, the bend 12 will be flattened out and the film will be held and maintained in a planar position with the film image plane while moving longitudinally between the edge guides as indicated by the arrows A in FIGS. 1 and 2. The rectangular images 16 along the length of the film strip will be aligned and maintained in a common plane while the film portion including the bend 12 is positioned between the parallel edge guides 22.

In order to move the film material 14 in a longitudinal direction (arrow A) while supported between the edge guides 22 and thereby forceably position and maintain the film in the planar position, the apparatus 10 can include a lower, idler roll 24 spaced below one edge portion 20 of the film strip and a toothed drive roll 26 spaced above the lower roll and having a plurality of radial, drive teeth which penetrate into perforations 18 on the adjacent edge portion of the film strip. The upper drive roll 26 is driven by a suitable drive motor 28 to rotate in a counterclockwise direction (arrows B, FIGS. 1 and 4) and the motor and drive roll are biased downwardly to press the film strip 14 against the lower idler roll 24 by means of a bias spring 30 having an upper end portion engaged by rotatable hand wheel 32 for adjusting the downward bias pressure on the film. The lower roll 24 turns in a clockwise direction whenever the motor 28 is energized to turn the toothed drive wheel 26 to advance the film strip 14 along the edge guides 22 as indicated by the arrows A.

Figure 3:
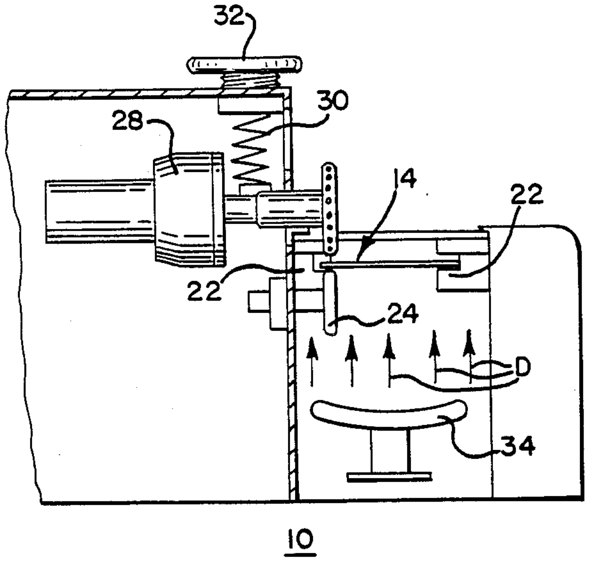
FIG. 3 is a transverse sectional view of the apparatus taken substantially along lines 3—3 of FIG. 2.
Figure 4:
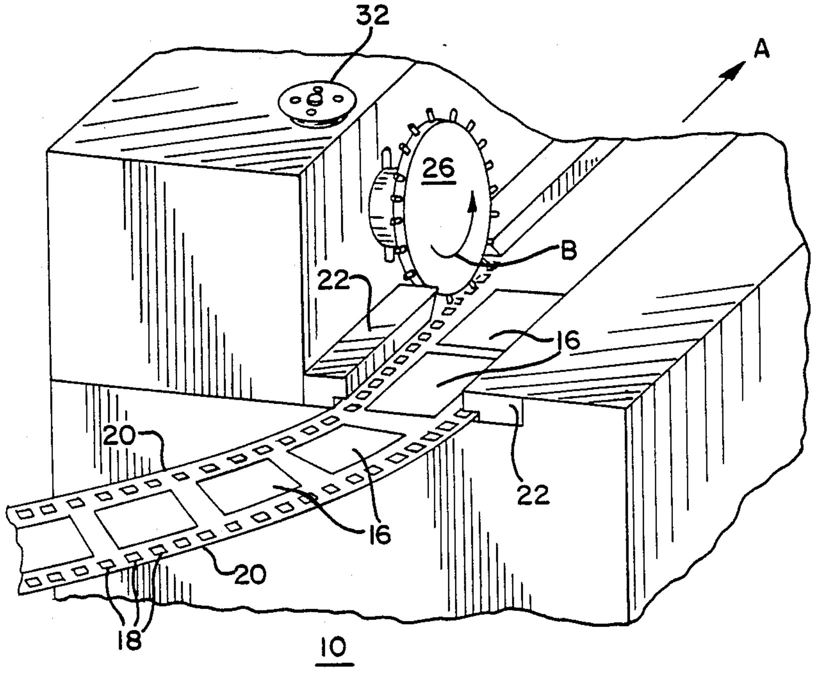
FIG. 4 is a perspective view of the entrance end of the apparatus.

As each bend area 12 on the film strip 14 is moved along the edge guides 22 by the toothed drive wheel 26 at an appropriate speed, heat is applied to the bend area 12 by means of a heat source 34 (radiant or hot air) as indicated by the arrows D in FIGS. 1 and 3. After heat is applied to the film portion in the previously existing bend areas 12 on the film strip, the film portion is maintained in the planar position between the edge guides 22. Subsequently, as the film moves on past the heat source 34, the film material cools and sets while the film portion is maintained in the planar position. Then further processing of the film strip 14 can be provided in the same film image plane.

It will be appreciated that various modifications and alterations may be made in the process as set forth above in accordance with the invention without thereby departing from the spirit and scope of the invention.

What is claimed is:

1. A process for treating a strip of negative or positive film material carrying images in a plane, said film material having at least one bend therein and having a plurality of perforations along opposed edges of said film material, to remove said bend in said film material; combining the steps of forceably positioning a portion of said film material having said bend therein into a common plane with said film image plane by lateral engagement of edge guide means with said opposed edges having said perforations, wherein said film material is arranged in a flat and longitudinally aligned condition by said lateral engagement, exposing said film portion while held in said common plane with said film image plane to heat for a predetermined period of time and at a predetermined temperature to remove said bend without damaging said film material, and thereafter permitting said heated film portion to cool and set.

2. A process as set foth in claim 1 wherein said heat is applied by means of hot air.

3. A process as set forth in claim 1 wherein said heat is applied in the form of radiant heat.

* * * * *